No. 698,191. Patented Apr. 22, 1902.
W. H. FENNER.
FINE FUEL COMBUSTION.
(Application filed July 31, 1901.)
(No Model.) 7 Sheets—Sheet 4.
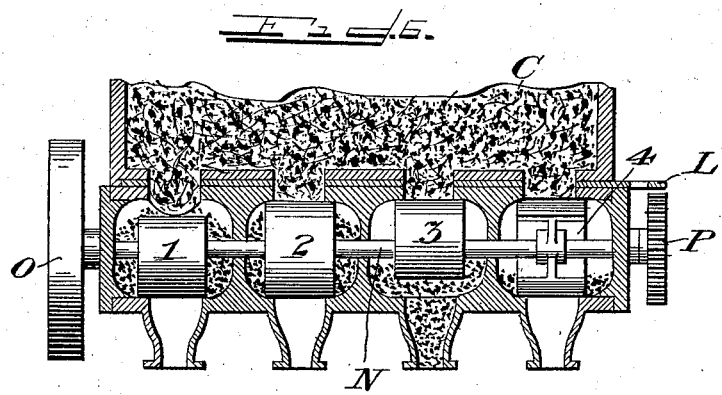
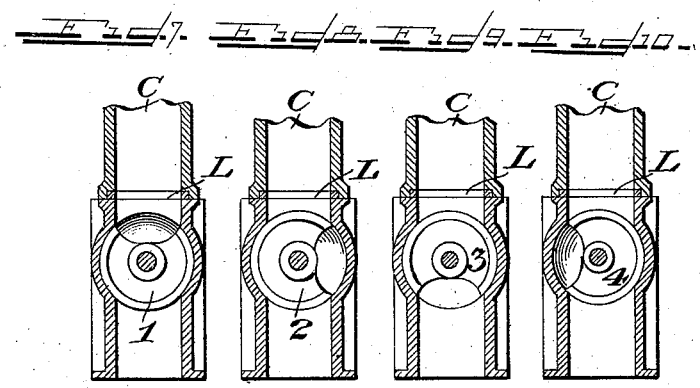
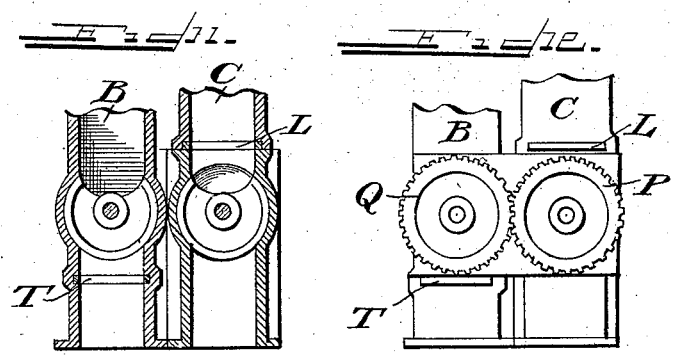

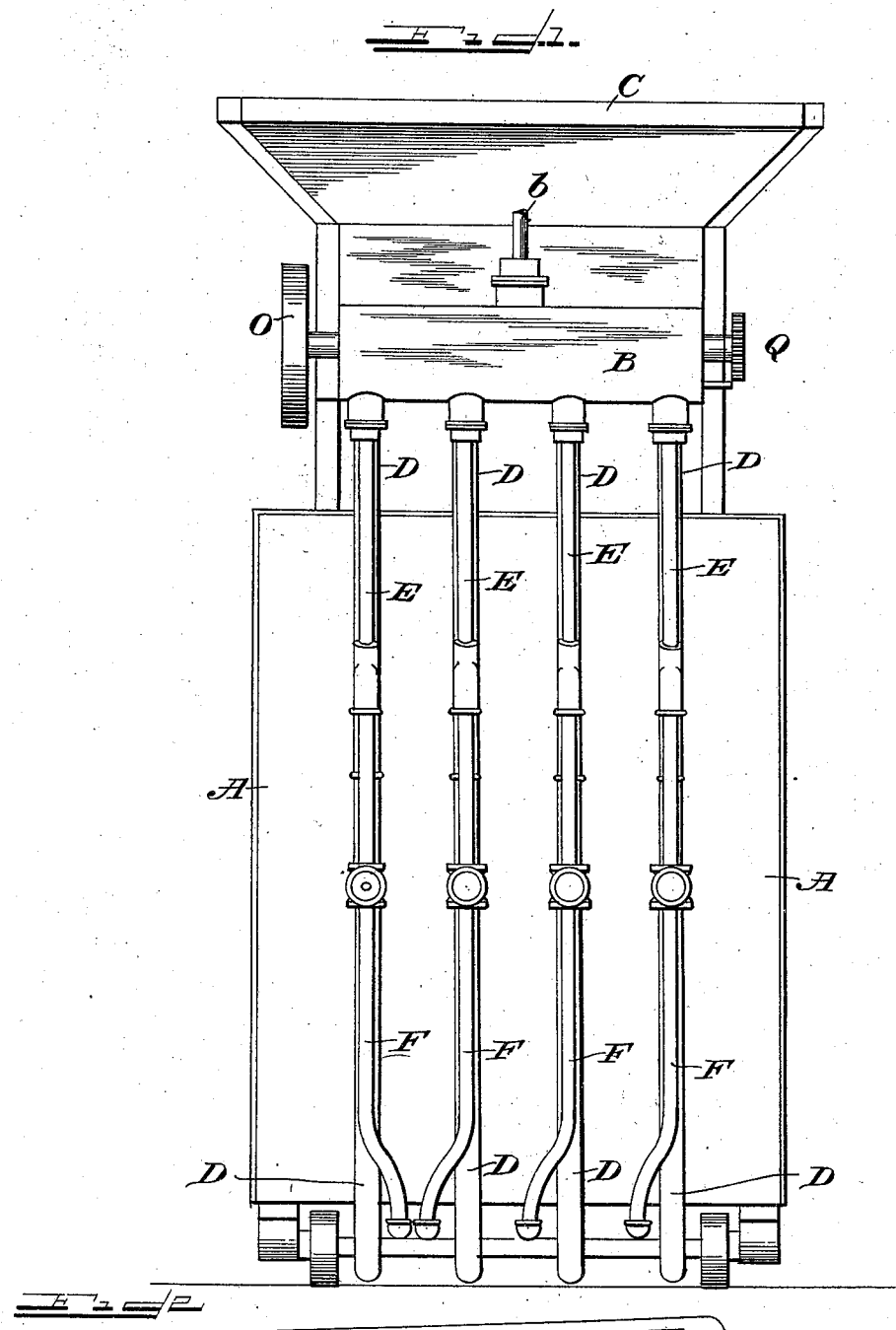

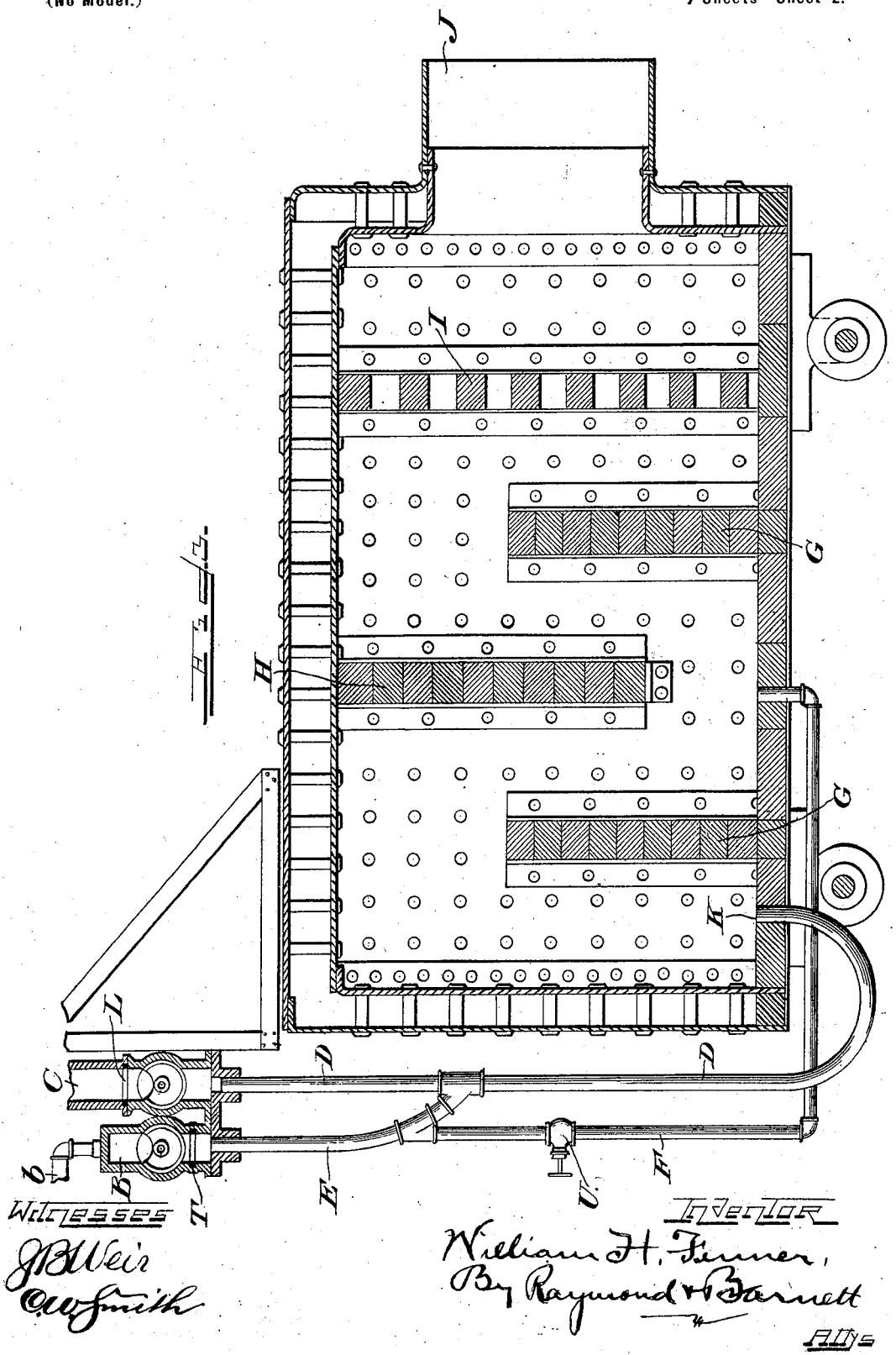

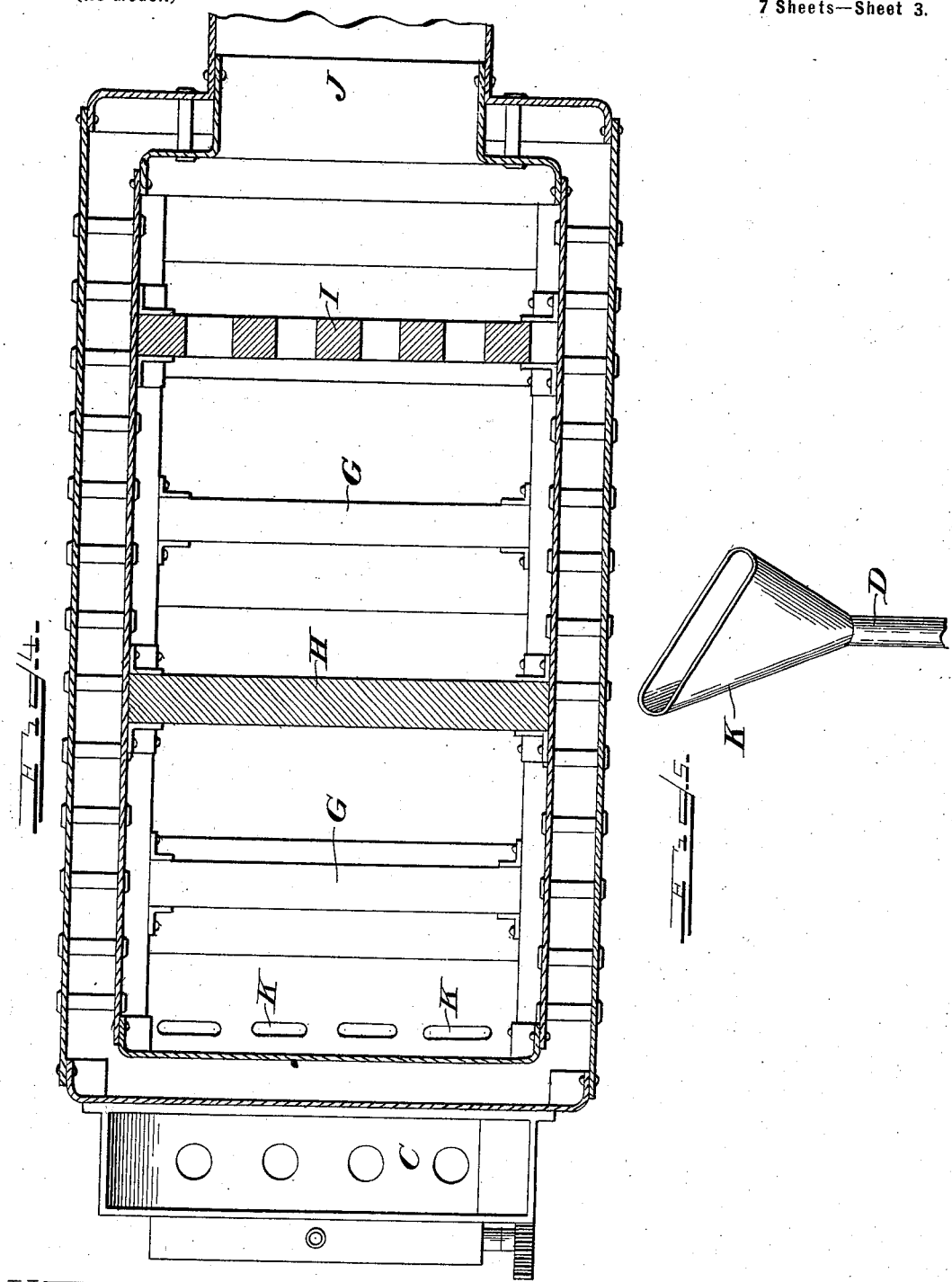

No. 698,191. Patented Apr. 22, 1902.
W. H. FENNER.
FINE FUEL COMBUSTION.
(Application filed July 31, 1901.)
(No Model.) 7 Sheets—Sheet 5.
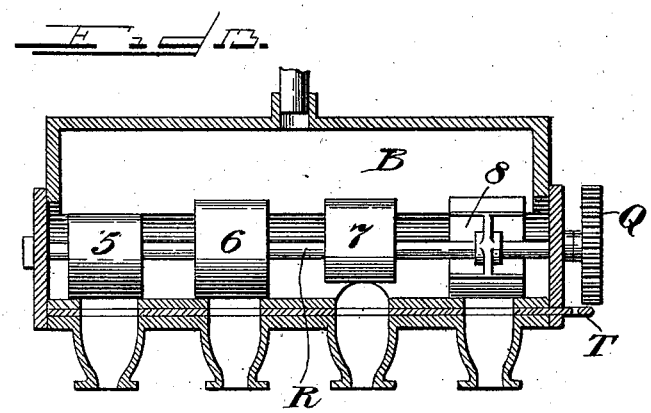
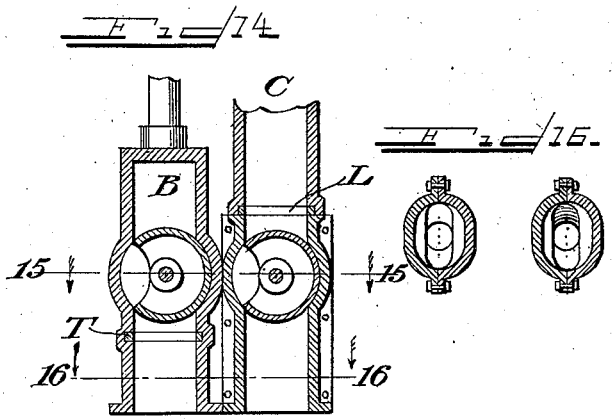
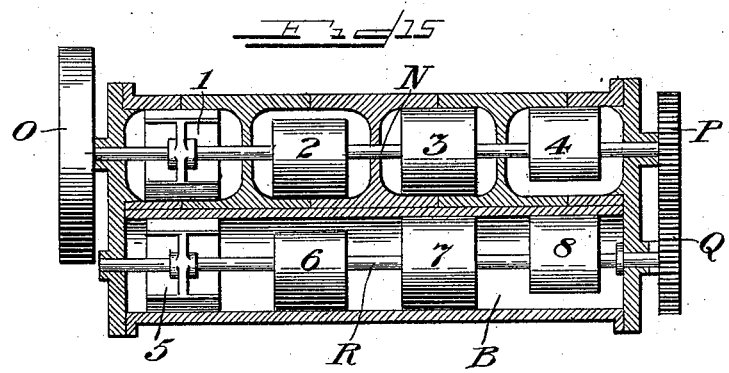
Witnesses
JB Weir
C.W. Smith
Inventor
William H. Fenner,
By Raymond & Barnett
Attys No. 698,191. Patented Apr. 22, 1902.
W. H. FENNER.
FINE FUEL COMBUSTION.
(Application filed July 31, 1901.)
(No Model.) 7 Sheets—Sheet 6.
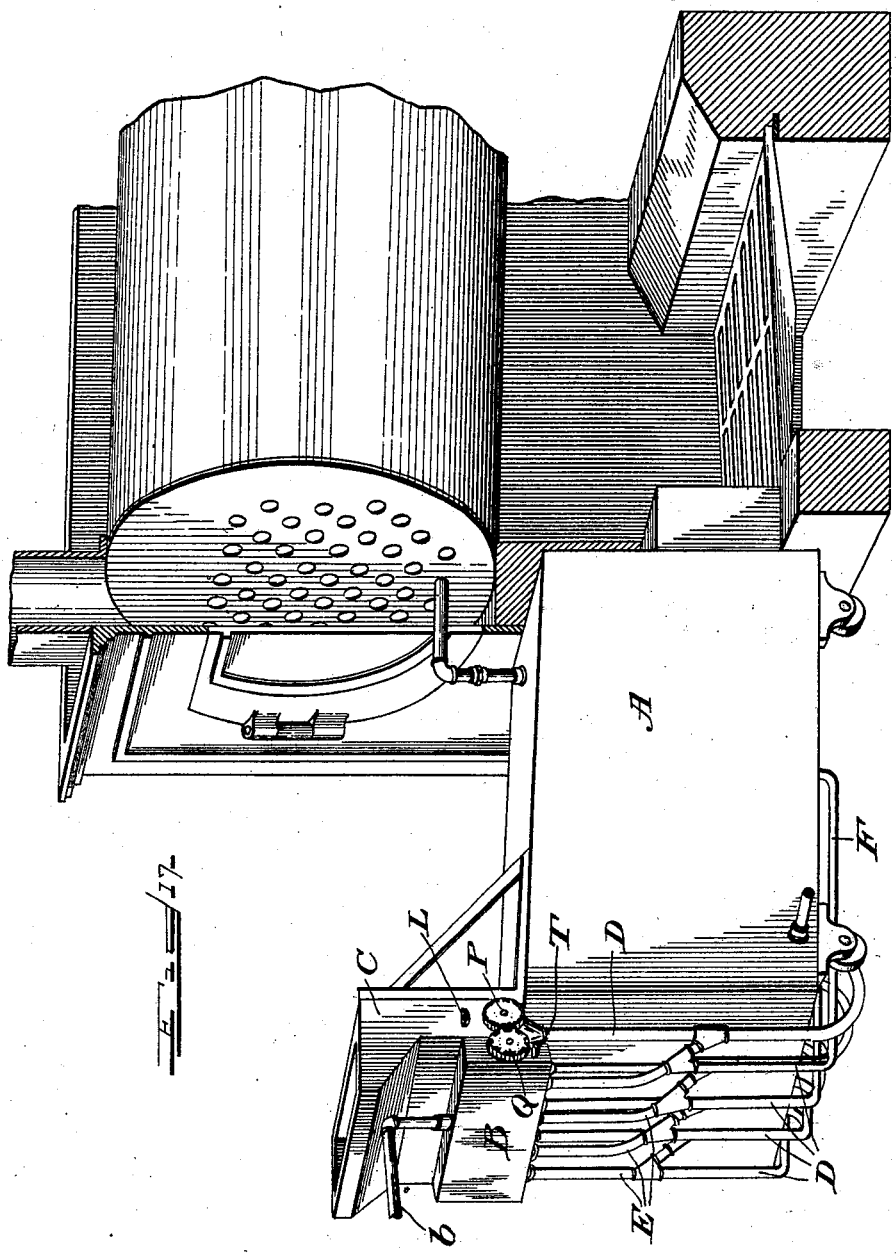

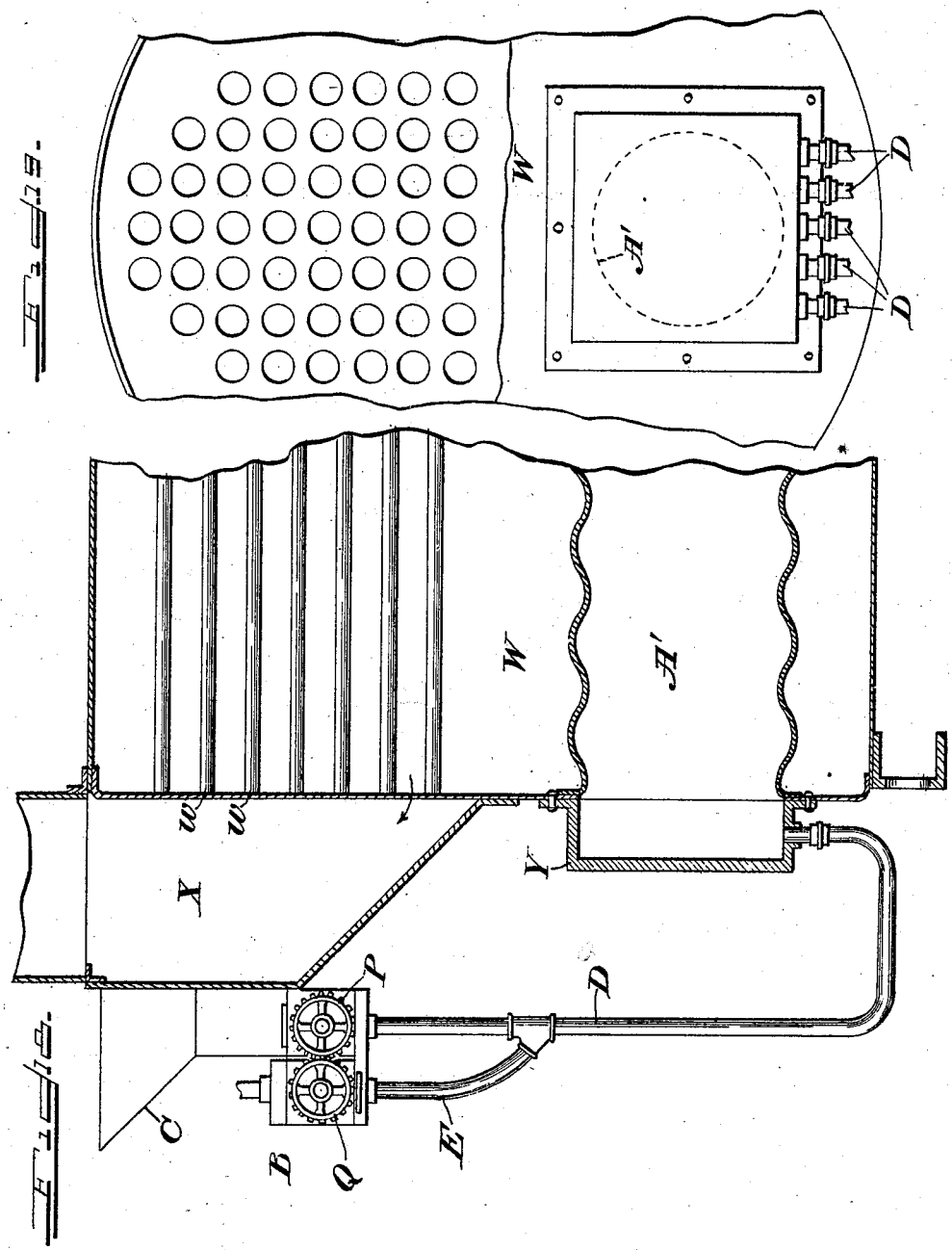

UNITED STATES PATENT OFFICE.

WILLIAM H. FENNER, OF CHICAGO, ILLINOIS.

FINE-FUEL COMBUSTION.

SPECIFICATION forming part of Letters Patent No. 698,191, dated April 22, 1902.

Application filed July 31, 1901. Serial No. 70,347. (No specimens.)

*To all whom it may concern:*

Be it known that I, WILLIAM H. FENNER, a citizen of the United States, residing at Chicago, in the county of Cook and State of Illinois, have invented certain new and useful Improvements in Fine-Fuel Combustion, of which the following is a specification.

By "fine fuel" I mean fuel either in a liquid or solid form which when it is introduced into the combustion-chamber is in a finely comminuted, powdered, or divided state. If the fuel to be burned is a solid, such as coal, it must be introduced in a pulverized state. If the fuel is a liquid, such as oil, it must be introduced into the combustion-chamber in a fine spray.

The object of my invention is to produce the prompt reduction of a solid or liquid fuel to its component gases, such reduction being brought about by the rapid or instantaneous combustion of such fuel while in suspension in a combustion-chamber.

A further object of my invention is to produce the combustion of the fuel in combination with a properly-proportioned and accurately-measured amount of atmospheric air or other fluid fuel element and to bring about the thorough admixture of the resulting gases and to retard the escape of such gases until brought to a high state of combustion.

A further object of my invention is to further enrich the gases evolved by the combustion of the fuel introduced in the combustion-chamber and to promote the combustion of such gases by the addition of atmospheric air or other fluid fuel element under control at a point in the combustion-chamber beyond the point where the initial combustion of the fuel takes place.

A further object of my invention is to promote the combustion of the fuel and of the resultant gases by retarding their escape from the combustion-chamber and by thoroughly intermixing the same by means of blasts of air or other fluid fuel element introduced under control to the combustion-chamber.

These and such other objects as may hereinafter appear are attained by the devices illustrated in the accompanying drawings, in which—

Figure 1 is an end elevation of a combustion-chamber provided with air and fuel supply pipes. Fig. 2 is a perspective view of a slide-valve for use with said apparatus. Fig. 3 is a longitudinal section through the apparatus shown in Fig. 1. Fig. 4 is a horizontal section through the apparatus shown in Figs. 1 and 3. Fig. 5 is a detail in perspective of one of the twyers. Fig. 6 is a sectional view through the fuel hopper and valves, the valves being shown in elevation. Figs. 7, 8, 9, and 10 are enlarged details of said valves, showing the same at different points in their revolution. Fig. 11 is a sectional view through one of the fuel-valves and its corresponding air-valve. Fig. 12 is a detail view of the valve-gearing. Fig. 13 is a sectional view through the air-chest and air-supply valves, the valves being shown in elevation. Fig. 14 is a view of adjacent air-valves and fuel-valves. Fig. 15 is a horizontal sectional view through the air-chest and the fuel-valve chambers, the valves being shown in elevation. Fig. 16 is a horizontal section on the line 16 16 of Fig. 14 looking in the direction indicated by the arrows. Fig. 17 is a perspective view of the apparatus shown in Figs. 1, 3, and 4 attached to a boiler of usual form. Fig. 18 shows a device for utilizing my improved process in connection with an internally-fired boiler; and Fig. 19 is an end view, partially broken away, of the device shown in Fig. 18.

Like characters of reference indicate the same parts in the several figures of the drawings.

Referring by letter to the accompanying drawings, A indicates a closed combustion-chamber. B is an air-chest containing air or any other fluid-fuel element under pressure. C is a fuel-hopper. D represents fuel-supply pipes leading from the fuel-hopper to the interior of the combustion-chamber. E represents air-supply pipes leading from the air-chest to the fuel-pipes at a point below the fuel-hopper. F represents supplemental air-pipes leading from the air-pipes E to the interior of the combustion-chamber A at a point beyond the inlet to the combustion-chamber from the fuel-pipes F. The interior of the combustion-chamber is preferably divided by walls G and arches H into a tortuous passage, the last wall I toward the discharge end of the furnace, if desired, being made into checker-work, so as to coöperate with the walls G and arches H in retarding the escape from the furnace of the gases of combustion. J is a contracted opening or flameway, which may be connected with the ordinary fuel-inlet of the usual fire-box under the boiler. At the point of inlet into the combustion-chamber the fuel-pipes are widened into twyers K, so that the fuel will be discharged into the combustion-chamber in a wide thin sheet of finely-divided fuel and air mixed.

As is well known, a highly-important element in the combustion of fuel for the production of steam is the admixture of a proper proportion of oxygen, whereby the greatest number of heat units is evolved, and the rapid combustion of the fuel, whereby the heat units are evolved as quickly as possible, thereby resulting in the production of an intense heat. The more thoroughly this admixture of air in proper proportions is obtained and the more rapidly the combustion of the fuel is brought about the more intense will be the resulting heat, and the efficiency of the furnace for steam-producing purposes will be increased accordingly.

As is well known, an improper or insufficient admixture of air in proportion to the amount of fuel used will result in the production of carbon-monoxid, the combustion of which will produce only a comparatively small number of heat units. If, however, the fuel and air are so proportioned and intermixed that the combustion of the fuel will produce carbon dioxid, the heat evolved will be increased many hundredfold.

In introducing fine fuel to a combustion-chamber and burning the same while in suspension the resultant combustion is rapid, not to say instantaneous, and is free from the drawbacks which attend the slower combustion of fuel upon a grate or under other like conditions where the constantly-forming ashes retard the combustion of the fuel and prevent the proper combination therewith of a sufficient proportion of oxygen to produce the best results.

The first and most important step in my process consists in measuring, proportioning, and combining the fuel and air and in then bringing about the combustion of the same in suspension in a closed combustion-chamber. This results in the almost instantaneous reduction of the fuel and air to inflammable gases, principally to carbon dioxid, and the next step in my process consists in retarding the escape of these gases from the combustion-chamber until the combustion of these gases is brought to a high state of efficiency, thereby developing a very intense heat. I retard the escape of these gases by introducing my mixed fuel and air intermittently and alternately from a plurality of twyers opening into the combustion-chamber in such a manner that the jets or blasts discharged from the different twyers intersect and conflict with each other, thereby producing a mixing action within the combustion-chamber. The intermittent and instantaneous combustion of each blast of mixed air and fuel as it is discharged into the combustion-chamber also produces an explosive expansion of gases which serves to still further prevent a direct current through the combustion-chamber and to intermix the gases of combustion, thereby promoting the efficient combustion of said gases. My process also contemplates the further enrichment, intermixture, and retarding of the gases of combustion, if desired, by discharging into the combustion-chamber intermittent blasts of air or other fuel element at a point beyond the point where the mixed air and fuel is first discharged into the combustion-chamber and consumed.

Broadly speaking, therefore, my process comprises, first, furnishing the combustion-chamber with blasts of mixed air and fuel, each blast consisting of a measured and properly-proportioned quantity of air and fuel; second, in consuming the mixed air and fuel while in suspension within the combustion-chamber, thereby rapidly reducing the fuel to its component gases, and in then intermixing said gases and retarding their escape from the combustion-chamber until they are brought to a high state of combustion.

In using the apparatus shown in the accompanying drawings this process is put into operation as follows: The hopper C is supplied with pulverized fuel, such as coal, and the air-chest B is supplied, through the pipe $b$, with air under pressure. The fuel-valves 1, 2, 3, and 4 and the air-valves 5, 6, 7, and 8 are geared together in pairs by means of the gears P Q, so that as each fuel-valve measures and discharges into its corresponding fuel-supply pipe a quantity of fuel the corresponding air-valve will uncover the inlet-port of the air-pipe connecting with the said fuel-pipe and said port will remain uncovered sufficiently long to admit the desired quantity of air under pressure, after which the inlet-port will be closed by its valve by reason of the rotation of the valve. As shown in the drawings, these valves are cylindrical bodies provided with cut-away portions or openings, which when they come opposite the openings from the fuel-hopper to the valve-chambers will admit fuel to the valve-chambers, and when they come opposite to the outlet-ports in the valve-chambers will allow fuel to escape into the corresponding fuel-supply pipes, while, as shown in Fig. 13, when the cut-away portion of an air-valve comes opposite to the corresponding inlet-port to an air-supply pipe such inlet-port will be unclosed and will remain unclosed until the valve in its rotation has reached the position of valve 8 in Fig. 13. By means of the slide-valve L, controlling the inlet-ports leading to the fuel-valve chambers, the rate of fuel-supply may be accurately gaged, and the fuel-supply, as well as the air-supply, may also be varied by changing the size of the openings in the valves.

The relative proportions of air and fuel may be varied at will by increasing or decreasing the air-pressure in the air-chest by changing the gears P Q and by altering the relative sizes of the fuel and air valves. As shown in the drawings, the valves are set on quarters, so that while some one pair of air and fuel valves is constantly feeding air and fuel to the supply-pipes no more than one pair will be opened at a time, and yet there will be no material interruption in the succession of blasts of air and fuel into the combustion-chamber. The valves may be operated by any convenient power supplied to the pulley-wheel O, which is rigidly mounted upon a shaft N, upon which are also rigidly mounted the valves 1 2 3 4 and the gear-wheel P. This gear in turn meshes into the gear-wheel Q, which, together with the valves 5 6 7 8, is rigidly mounted upon a shaft R. I find it desirable to set the pairs of fuel and air supply pipes in such relation to each other that air will be admitted to the air-supply pipe shortly after fuel is fed to the corresponding fuel-supply pipe. This will result in introducing the supply or blast of air to the fuel-supply pipe back of the charge of fuel, thereby more effectively serving to discharge the fuel into the combustion-chamber.

It will be observed that with the device shown and described I am able to accurately measure and proportion the amounts of fuel and air in each charge and to admit such mixed and proportioned charges of air and fuel to the closed combustion-chamber in intermittent blasts. Each blast as it is admitted to the combustion-chamber will be discharged in fan-like form because of the peculiar shape of the twyers, as shown, and these intermittent blasts following each other in rapid succession will of themselves set up an agitation and a mixing action within the combustion-chamber which will interfere with and prevent the establishment of a direct current through the combustion-chamber, which might tend to carry some portion of the fine fuel out of the combustion-chamber before it was consumed. In addition to this agitation and pulsation caused by the intermittent and rapidly succeeding blasts the rapid combustion of each charge of fuel as it is discharged into the combustion-chamber, such fuel being burned in a flash, results in an expansive or explosive action, which serves to still further agitate and intermix the currents and gases within said closed combustion-chamber. If now it be desired to further enrich and agitate these gases after the first ignition of each charge of fuel, I use the pipe F, admission to which is controlled by the hand-operated valve U, through which pipe, with each blast of air and fuel into the combustion-chamber, a secondary blast of air will be discharged into the combustion-chamber at any other desired point.

As the fuel and air supply are under control and may be varied at will, the amount of air discharged into the air-pipe with each revolution of the valves will of course be varied to such an extent as may be necessary to supply sufficient air for the combustion of each charge of fuel, as well as sufficient air for a supplemental blast through the pipe F, if desired.

With the form of device shown in Figs. 1, 3, 4, and 17 my improved process may be practiced to bring the gases to a high state of combustion, at which point they will be discharged at an intense heat through the flameway J, which, as shown in Fig. 17, may be connected through the usual feed-door into the fire-box of an ordinary boiler.

In Fig. 18 I have shown how my process of combustion may be practiced with an internally-fired boiler, in which W is the boiler, within which is disposed a fire-box A', from which the products of combustion pass back of the boiler, return through the fire-tubes $w$, and escape through the uptake X. In this type of boiler the fire-box A' extends through the water-chamber of the boiler. To adapt my process for use with a boiler of this type, a cap or hood Y may be bolted over the feed-opening of the boiler. Fuel-supply pipes D lead to this cap and are provided with air-supply pipes, an air-chest, twyers, air and fuel valves, and a fuel-hopper, as before.

In adapting my process to a boiler of this description it will be observed that the fire-box of the boiler is used as the closed combustion-chamber. As in so doing the necessity of using a grate is dispensed with and there are practically no ashes resulting from the combustion, it will be seen that the fire-box A', which is surrounded on all sides with water, will be filled with a mass of flame in a high state of combustion, resulting in a much greater steam-producing efficiency than when this type of boiler is used in the usual manner.

Obviously my process may be practiced with various forms of apparatus and may be utilized in connection with many different kinds of boilers and furnaces without departing from the practice of my invention. So, also, my invention is not confined to the admixture of the fine fuel and the fluid fuel element before their introduction into the combustion-chamber nor their introduction through the same pipes or twyers.

Having thus described my invention, what I claim, and desire to secure by Letters Patent, is—

1. The process of burning fine fuel which comprises measuring a charge of fine fuel and a charge of a fluid fuel element and in forcing said measured charges simultaneously and in suspension upward into a zone of combustion, substantially as described.

2. The process of combustion which comprises supplying a zone of combustion with rapidly-succeeding fuel charges in suspension, each charge consisting of a measured quantity of fine fuel and a correspondingly measured and proportioned quantity of a fluid fuel element, substantially as described.

3. The process of combustion which comprises supplying a zone of combustion within a closed combustion-chamber, with measured and relatively proportioned quantities of fine fuel and of fluid fuel element in suspension in rapidly-succeeding interrupted blasts, substantially as described.

4. The process of combustion which comprises supplying a zone of combustion within a closed combustion-chamber with successive measured charges of fine fuel and a fluid fuel element in suspension and combined in relatively proportioned quantities, substantially as described.

5. The process of combustion which comprises the introduction into a supply-pipe of a measured charge of fine fuel, together with a measured and correspondingly-proportioned charge of fluid fuel element, and in then supplying said combination of fine fuel and fluid fuel element in suspension from said supply-pipe to a zone of combustion in a closed combustion-chamber in interrupted blasts, substantially as described.

6. The process of combustion which comprises supplying a zone of combustion in a closed combustion-chamber with measured charges of fine fuel, and measured and correspondingly-proportioned charges of fluid fuel element and in intimately intermixing said fuel elements, and the gases within said combustion-chamber by means of interrupted and conflicting blasts, substantially as described.

7. The process of combustion which comprises the combustion of fine fuel in suspension within a combustion-chamber and the introduction into said combustion-chamber, during the process of combustion, of interrupted and interfering blasts, substantially as and for the purposes described.

8. The process of combustion which comprises supplying fine fuel to a zone of combustion within a combustion-chamber and promoting the combustion of said fuel in suspension, and the intermixture of the combustible gases and other fuel elements within said combustion-chamber, by the introduction into said chamber of interrupted and interfering blasts, substantially as described.

9. The process of combustion which comprises the combustion of fine fuel in suspension, in a closed combustion-chamber, and the production within said combustion-chamber, during the process of combustion of an agitating and mixing action by the introduction into said combustion-chamber of alternating and interrupted blasts, substantially as and for the purposes described.

10. The process of combustion which comprises the introduction of fine fuel to a zone of combustion and the promotion of the intimate intermixture of said fine fuel, in suspension, with a fluid fuel element by the use of upwardly-directed, interrupted blasts, substantially as described.

11. The process of combustion which comprises the introduction of fine fuel to a zone of combustion and the promotion of the intimate intermixture of said fine fuel in suspension with a fluid fuel element by means of upwardly-directed and alternately-acting interrupted blasts, substantially as described.

WILLIAM H. FENNER.

Witnesses:
M. E. SHIELDS,
O. R. BARNETT.